Sept. 20, 1927.

W. E. McDONELL

OPHTHALMIC MOUNTING

Original Filed Dec. 13, 1920

1,643,218

INVENTOR
William E. McDonell
BY
his ATTORNEYS

Patented Sept. 20, 1927.

1,643,218

UNITED STATES PATENT OFFICE.

WILLIAM E. McDONELL, OF ROCHESTER, NEW YORK, ASSIGNOR, BY MESNE ASSIGNMENTS, TO SHUR-ON STANDARD OPTICAL COMPANY, INC.

OPHTHALMIC MOUNTING.

Application filed December 13, 1920, Serial No. 430,123. Renewed July 29, 1927.

The present invention relates to ophthalmic mountings and an object thereof is to provide an improved connection between the temples and the lens frames, particularly in that type of mounting in which the temples and the lens frames are formed from non-metallic material such as zylonite, celluloid or the like. A further object of this invention is to provide in an ophthalmic mounting having the lens frames and temples formed of non-metallic material, a metallic hinge which will be strong and durable in use and at the same time will be so mounted as to be invisible from the sides or front of the mounting. A still further object of the invention is to provide a hinged connection between a non-metallic temple and a non-metallic lens frame which will be secured to the parts in such a manner that screws or other separate fastening devices are unnecessary. A still further object of the invention is to provide a hinged connection between a non-metallic temple and a non-metallic frame which will strengthen these parts adjacent the hinge. Another and still further object of the invention is to provide a reinforcing piece for the temple pivoting extension of a non-metallic lens frame which will act as a lock for preventing the turning of the lens.

To these and other ends the invention consists of certain parts and combinations of parts, all of which will be hereinafter described, the novel features being pointed out in the appended claims.

Figure 1:
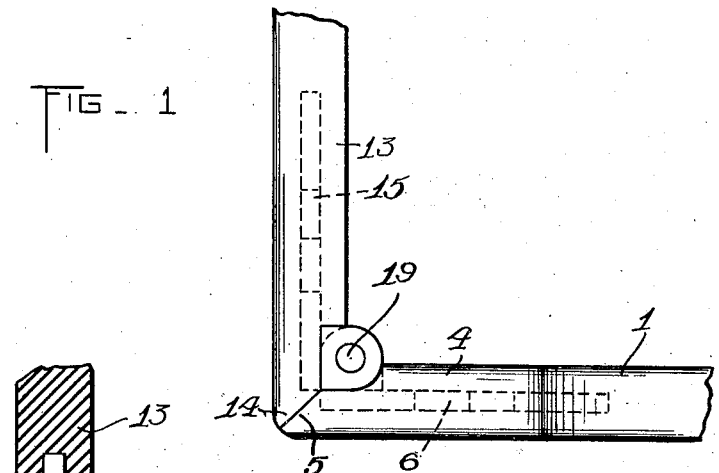
Fig. 1 is a plan view of a fragment of an ophthalmic mounting adjacent one of the lens frames and one of the temples.
Figure 2:
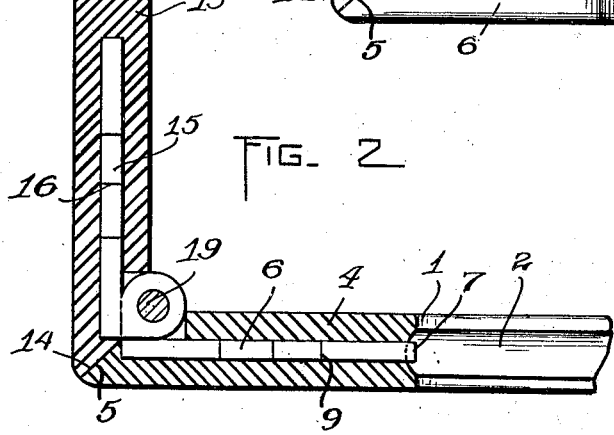
Fig. 2 is a horizontal section of the parts shown in Fig. 1.
Figure 4:
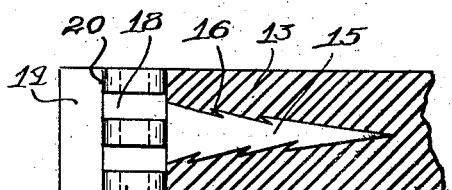
Fig. 4 is a sectional view showing the manner in which the temple end is reinforced by the means for pivotally securing such temple to the lens frame.
Figure 3:
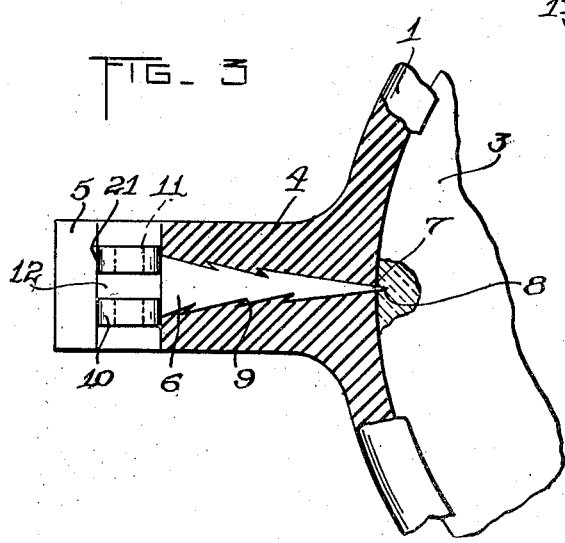
Fig. 3 is a vertical section through a fragment of a lens frame and its extension showing the manner in which the metal reinforcing piece locks the lens against turning.

Referring more particularly to the drawings, 1 indicates the lens frame, of which only a fragment is shown, having a lens receiving groove 2 in which the lens 3 is received. The frame 1 has an integral extension 4 at one side formed of non-metallic material and provided with a bevelled end 5. In this non-metallic extension is arranged a metallic reinforcing piece 6 preferably extending entirely through the extension and having its inner end projecting at 7 into the groove 2 so as to enter a notch 8 formed in the lens 3 for the purpose of preventing the turning of the lens in the lens frame especially where the frame and the lens are both of circular form. This reinforcing piece 6 preferably has prongs 9 on opposite sides extending toward the outer end of the reinforcing piece. At its outer end this reinforcing piece may be provided with one or more ears 10 formed with aligned perforations 11, flat surfaces 12 being provided on the reinforcing pieces between and on opposite sides of the two ears 10 so as to form an abutment for limiting the outward movement of the temple.

The temple 13 has, in this instance, its hinged end made of non-metallic material such as zylonite, celluloid, or the like and has its end bevelled at 14 so as to cooperate with the bevelled portion 5 on the frame extension 4 and provide a closed joint between these parts when the temple is in open position. The temple may also be reinforced by an insert or reinforcing piece 15 having prongs 16 on opposite sides extending toward the pivoted end of the temple. At its outer end the temple may be provided with one or more ears 17 extending inwardly from the reinforcing piece 5 and having abutting surfaces 18 between them. The ears 17 have aligned openings and a pivot pin 19 passes through these aligned openings and the aligned openings of the ears 10 to pivotally connect the temple to the lens frame. One side of each of the ears 17 is flattened at 20 to cooperate with the abutments 12 on the reinforcing piece 6, while one side of each of the ears 10 is flattened at 21 to cooperate with the abutments 18 on the reinforcing piece 15.

From the foregoing it will be seen that there has been provided an ophthalmic mounting in which the lens frames and temples are made of non-metallic material and are connected by a hinge or pivot which has anchoring portions extending into the temple and the frame extension in such a manner as to reinforce these parts adjacent the hinge where most of the strain occurs. The hinge is invisible from the front and the sides of the mounting and permits the non-metallic parts of the temples and frames to be brought into abutment without placing any strain on the abutting portions of the parts due to the fact that the hinge members are provided with abutting portions. The member of the hinge which is secured in the frame extension may project into the lens groove and act as a lens lock for preventing the turning of the lens in the frame.

What I claim as my invention and desire to secure by Letters Patent is:

1. An ophthalmic mounting comprising a non-metallic lens frame having a non-metallic extension at one side, said extension being provided with a bevelled end portion, a temple having a bevelled non-metallic end portion, and a hinged connection between the temple and the extension, permitting the bevelled portions to abut and embodying two pivotally connected metallic members secured to the frame and the temple and having abutting portions cooperating, when the abutting portions on the temple and extension cooperate, for the purpose of limiting the outward movement of the temple.

2. An ophthalmic mounting comprising a non-metallic lens frame provided with a lens groove and having a non-metallic extension at one side thereof, a reinforcing piece extending through the extension and into said lens groove to act as a lens lock.

3. An ophthalmic mounting comprising a non-metallic lens frame provided with a lens groove and having a non-metallic extension at one side thereof, a reinforcing piece extending through the extension and into said lens groove to act as a lens lock, and a temple pivotally connected to said reinforcing piece.

4. In a non-metallic spectacle frame, rims, carriers on the rims provided with grooves in their ends, and metallic members comprising shanks embedded in the carriers, and rings on the shanks registering in the grooves.

5. An ophthalmic mounting comprising a non-metallic lens frame formed with an extension at one side bevelled at its end, a temple having an inner end bevelled and formed of non-metallic material to cooperate with the bevel on the extension of the lens frame, and a hinged connection between the temple and the extension embodying two members, each having a portion embedded in one of the first two named parts and a portion pivotally connected to a like portion on the other member in the connection, such portion on the lens frame member projecting rearwardly from the extension adjacent the bevel of the latter and such portion on the temple member extending rearwardly from the temple adjacent the bevel on the temple.

6. The combination in a spectacle frame, of a hinge joint for connecting the temple bars to the lens frames, comprising socketed portions in the confronting ends of the temple bar and lens frame for respectively receiving and concealing the hinge leaves.

7. In a spectacle frame including lens rims, temple bars and a hinged connection therebetween, socketed portions formed in the confronting ends of each temple bar and each lens rim for receiving, securing and concealing the leaves of the hinged connection.

8. In a spectacle frame, a joint for hingedly connecting the temple bars to the lens rims comprising a hinge embodying a pair of hinge leaves provided respectively with knuckles and a hinge pin extending therethrough, said temple bars and lens rims proxided respectively with recesses extending inwardly from their confronting ends for receiving and concealing the hinge leaves.

WILLIAM E. McDONELL.